Nov. 3, 1964     A. F. YANNA     3,155,105
AUTOMATIC TRANSFER CONTROL VALVE
Filed Dec. 19, 1961     2 Sheets-Sheet 1
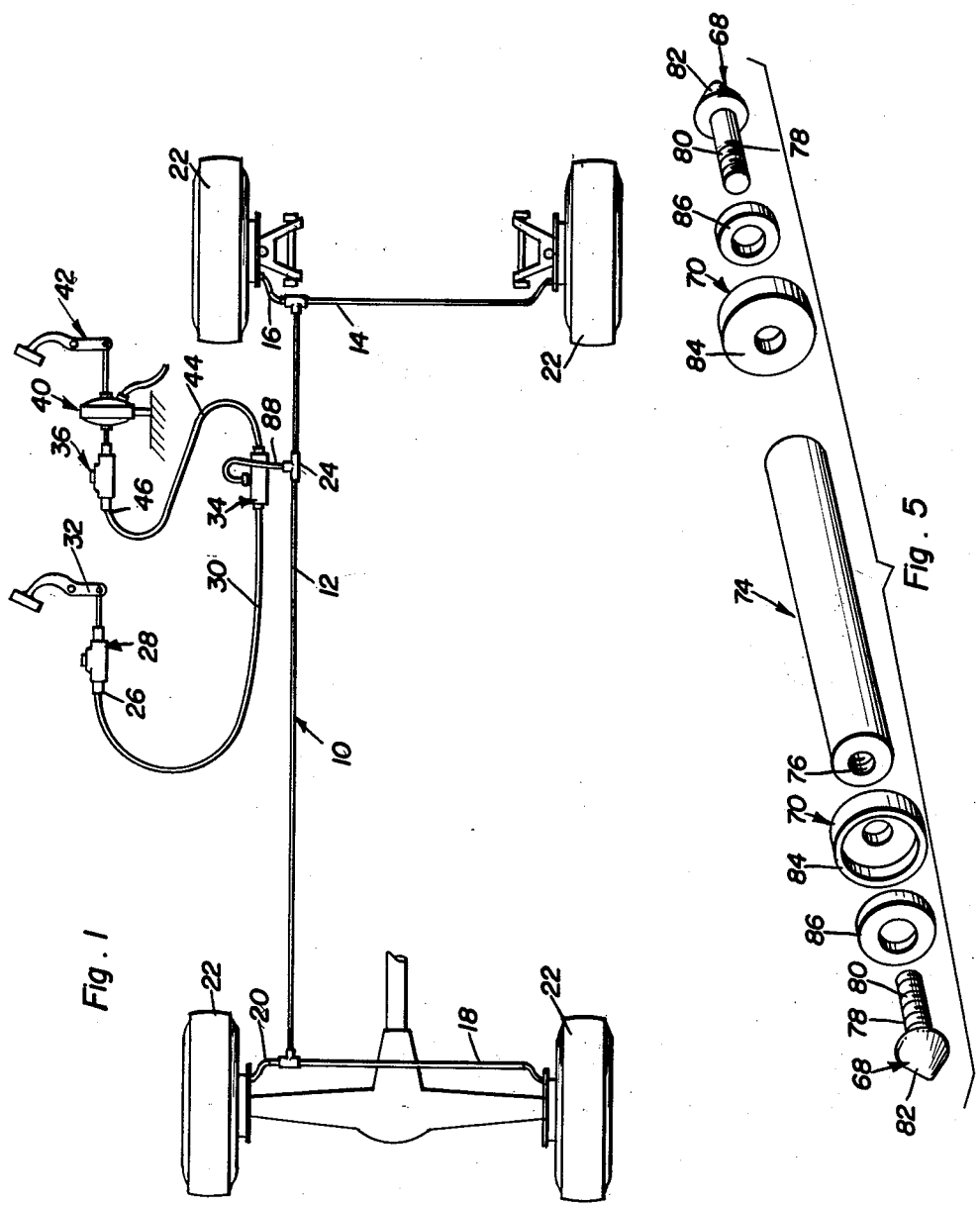
Andrew F. Yanna
INVENTOR.

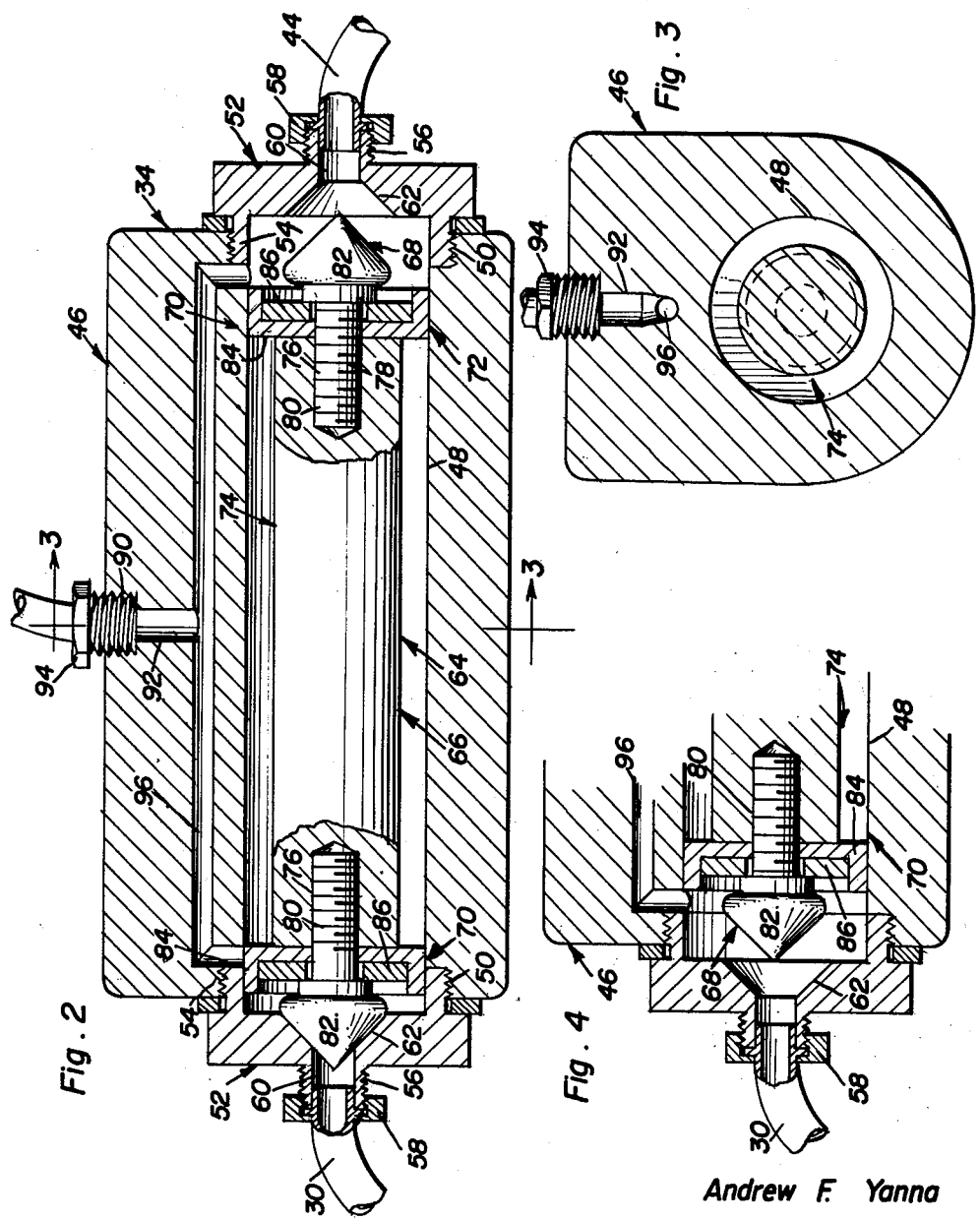

United States Patent Office 3,155,105
Patented Nov. 3, 1964

3,155,105
AUTOMATIC TRANSFER CONTROL VALVE
Andrew F. Yanna, 4389 Jean Road, Bay City, Mich., assignor of one-third to Martin B. Legatz and one-third to Gerald P. Laracey
Filed Dec. 19, 1961, Ser. No. 160,615
1 Claim. (Cl. 137—112)

This invention relates to a novel and useful transfer control valve and to a transfer control valve operatively associated with the hydraulic brake system of a motor vehicle including a second or supplemental master cylinder and the automatic transfer control valve is automatic in operation and will automatically and alternately communicate the outlets of the master cylinders with the main hydraulic line of the vehicle hydraulic brake system in such a manner so as to communicate the master cylinder which is effecting the greater fluid pressure while simultaneously terminating communication of the other master cylinder with the wheel cylinders of the vehicle hydraulic brake system.

The automatic transfer control valve of the instant invention has been primarily designed for providing a means whereby a pair of master cylinders, one being the conventional master cylinder and the other being an emergency brake master cylinder either manually operated or operated by means of suitable motor means, each may be alternately utilized to actuate the hydraulic brake system while simultaneously terminate communication of the other master cylinder with the wheel cylinders of the hydraulic brake system upon actuation of that master cylinder to effect a greater pressure in the hydraulic system than that being effected by the other master cylinder.

The main object of this invention is to provide an automatic transfer control valve which may operate automatically to communicate the one master cylinder of a hydraulic brake system including two master cylinders with the wheel cylinders of that hydraulic brake system while simultaneously terminating communication of the other master cylinder with the wheel cylinders of the hydraultc brake system.

A further object of this invention, in accordance with the immediately preceding object, is to provide an automatic transfer control valve which may be readily incorporated into existing hydraulic brake systems.

A final object to be specifically enumerated herein is to provide an automatic transfer control valve in accordance with the preceding objects which conform to conventional forms of manufacture, be of simple construction and automatic in operation for the purpose intended so as to provide a device that will be economically feasible, long lasting and dependable in operation.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 1 is a diagrammatic view of a conventional type of hydraulic brake system with the automatic transfer control valve of the instant invention operatively associated therewith and with a supplemental or second manually operable and motorized master cylinder;

FIGURE 2 is an enlarged longitudinal sectional view taken substantially upon a plane passing through the longitudinal center line of the automatic transfer control valve;

FIGURE 3 is a transverse sectional view taken substantially upon the plane indicated by section line 3—3 of FIGURE 2;

FIGURE 4 is a fragmentary longitudinal sectional view similar to that of FIGURE 2 but showing the double ended piston assembly in and alternate position; and FIGURE 5 is an exploded perspective view of the double ended piston assembly.

Referring now more specifically to the drawings the numeral 10 generally designates a vehicle hydraulic brake system. The hydraulic brake system 10 includes a main manifold line 12 whose opposite ends are communicated with branch conduits 14, 16, 18 and 20 which each service one of the brake assemblies (not shown) operatively associated with the wheel 22. A T-fitting 24 is disposed in the manifold line 12 and the T-fitting 24 is usually utilized to communicate the outlet 26 of the conventional master cylinder generally referred to by the reference numeral 28 with the manifold line 12 by means of fluid passage means 30. In this manner, the hydraulic brake fluid could move from the master cylinder 28 through the fluid passage 30 and into the manifold line or service fluid line 12.

However, the automatic transfer control valve means of the instant invention is generally referred to by the reference numeral 34 and it will be noted that a second or supplementary master cylinder generally referred to by the reference numeral 36 is provided. The second or supplementary master cylinder 36 may be actuated by means of a fluid motor generally referred to by the reference numeral 40 and/or a manual emergency brake actuator generally referred to by the reference numeral 42.

In this instance, the first fluid passage line 30 is communicated with one end of the automatic transfer control valve 34 and a second fluid passage line 44 communicates the outlet 46 of the master cylinder 36 with the other end of the automatic transfer control valve means 34.

With attention now invited to FIGURES 2 through 5 of the drawings, it will be seen that the automatic transfer control valve means 34 comprises a cylinder body generally referred to by the reference numeral 46 which has a longitudinal piston bore 48 formed therethrough. A threaded counterbore 50 is formed in each end of the piston bore 48 and an end wall generally referred to by the reference numeral 52 is provided with a threaded neck portion 54 and is threadedly engaged in each of the counterbores 50.

The first and second fluid passage lines 30 and 34 are secured to the corresponding externally threaded neck portion 56 carried by each end wall 52 by means of a fitting 58. Each of the neck portions 56 has a passage 60 formed therethrough and it will be noted that the inner end of each passage 60 defines a conical seat portion 62. A pressure responsive valve assembly generally referred to by the reference numeral 64 and comprising a double-ended piston assembly generally referred to by the reference numeral 66 is disposed in the piston bore 48 and is reciprocal therein.

The double-ended piston assembly 66 includes opposite end valve element means generally referred to by the reference numerals 68 and also opposite end valve member means generally referred to by the reference numerals 70. Each of the valve member means comprises a piston head assembly generally referred to by the reference numeral 72. A connecting rod generally referred to by the reference numeral 74 is disposed between each piston head assemblies 72 and is provided with opposite end threaded blind bores 76 in which the threaded shank portion 78 of a headed fastener is threadedly engaged. Each of the headed fasteners 80 includes a diametrically enlarged head portion 82 which is utilized to retain the corresponding piston cup 84 the corresponding piston head assembly 72 on the associated end of the rod 74 by means of a retaining washer 86. It will be noted that each of the enlarged head portions 82 comprises a corresponding valve element member 68 and that each of the latter is conical and seatingly engageable in the corresponding conical seat 62.

Third passage means in the form of line 88 is utilized to communicate both ends of a piston bore 48 with the T-fitting 24 and it will be seen that one end of the line 88 is secured in the T-fitting 24 and that the other end of the line 88 is secured in a threaded counterbore 90 formed in the outer end of the outlet port 92 of the cylinder body 46 by means of a fastener 94.

The inner end of the outlet port 92 is communicated with a branch passage 96 intermediate the opposite ends thereof and the ends of the branch passage 96 open into the opposite ends of the piston bore 48 a spaced distance from the terminal ends thereof.

From a comparison of FIGURES 2 and 4 of the drawings it may be seen that the double-ended piston assembly 66 may be reciprocated in the piston bore 48 to move the valve element members 68 into and out of seating engagement in the conical seat 62. Additionally, it will be noted that when the valve element member 68 on one end of the double-ended piston assembly 66 is disposed in seating engagement with the corresponding conical seat 62 the piston cup 84 carried by the other end of the double-end piston assembly 66 is out of registry with the coresponding end of the branch passage 96 whereby the master cylinders 28 and 36 may be alternately utilized to effect operation of the brake mechanisms (not shown) operatively associated with the wheels 20. In operation, if the master cylinder 28 is actuated the double-ended piston assembly 66 will move to the right from a position illustrated in FIGURE 2 of the drawings whereupon the valve element member 68 carried by the right end of the double-ended piston assembly 66 will be seatingly engaged with the corresponding conical seat 62 thus terminating communication between the master cylinder 36 and the third fluid line 88. Actuation of the master cylinder 28 will also move the piston cup 84 of the piston head assembly 72 on the left side of FIGURE 2 out of registry with the corresponding end of the branch passage 96 as viewed in FIGURE 4 while also simultaneously moving the corresponding valve element member 68 out of seating engagement with the corresponding conical seat 62. Of course, any time the master cylinder 36 is actuated with sufficient force to effect a greater fluid pressure in the line 44 than the fluid pressure in the line 30, the double-ended piston assembly 66 will again be returned to its position illustrated in FIGURE 2 of the drawings.

Therefore, it may be seen that each of the master cylinders 28 and 36 may be utilized to actuate the brake system 10 and that when one master cylinder is actuated, the other master cylinder will have its communication with the manifold line 12 terminated. Thus, the actuation of one master cylinder will not result in hydraulic fluid within the system 10 being backed up in the other master cylinder.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

For use with a fluid service line and first and second fluid pumps each provided with an outlet having one end of a fluid passage line connected thereto, an automatic transfer control valve adapted to alternately communicate the other ends of said fluid passage lines with said service line in response to inverse fluid pressure differential changes in said outlets, said control valve including an elongated cylindrical body having a longitudinal bore formed therethrough, end walls removably secured to opposite ends of said body each having an inlet passage formed therethrough aligned with the longitudinal axis of said bore, the inner ends of said passages each defining a conical seat, a piston freely reciprocable in said bore and including diametrically enlarged opposite end oppositely facing sealing cups disposed in sliding sealing engagement with the surfaces of said bore, elongated passage means in said body opening at opposite ends into the opposite ends of said bore adjacent said end walls, an outlet port formed in said body and communicated at one end with said passage means and opening outwardly of said body at the other end and adapted to be communicated with said fluid service line, the outer ends of said inlet passages each being adapted for communication with one of said fluid passage lines, said piston including opposite end conical head portions aligned with the longitudinal axis of said bore and projecting outwardly beyond the corresponding cup, said conical head portions being alternately seatingly engageable in said seats upon reciprocation of said piston, the distance between said seats, heads and cups being such that when one of said heads is seated in the corresponding seat an effective sealing portion of the adjacent cup is registered with the corresponding end of said passage means closing the latter and the other head is disposed inwardly of said body from the corresponding seat and the effective sealing portion of the cup adjacent thereto is displaced inwardly of the adjacent end of said body from the corresponding end of said passage means, said sealing cups each being generally cylindrical and provided with one centrally apertured end wall, a centrally apertured retaining washer snugly disposed in each cup and against the end wall thereof, the opposite ends of said piston including threaded and blind axial bores, said head portions each including a threaded shank portion passed through the corresponding one of said end walls and washers and threadedly secured in the corresponding blind bore.

References Cited in the file of this patent

UNITED STATES PATENTS

| | | |
|---|---|---|
| 1,686,310 | Beebe | Oct. 2, 1928 |
| 1,720,610 | Sanford | July 9, 1929 |
| 1,870,484 | Basta | Aug. 9, 1932 |
| 1,987,435 | Engel | Jan. 8, 1935 |
| 2,551,045 | Parker | May 1, 1951 |
| 2,691,385 | Budd | Oct. 12, 1954 |
| 2,729,226 | Jones | Jan. 3, 1956 |
| 2,948,570 | Pease | Aug. 9, 1960 |

FOREIGN PATENTS

| | | |
|---|---|---|
| 448,062 | Italy | May 9, 1949 |